United States Patent [19]
Ruehl et al.

[11] Patent Number: 5,308,115
[45] Date of Patent: * May 3, 1994

[54] VEHICLE FRAME WITH OVERLAPPED SECTIONS

[75] Inventors: Phillip C. Ruehl, Elm Grove; Benjamin E. Coursin, Milwaukee, both of Wis.

[73] Assignee: A. O. Smith Corporation, Milwaukee, Wis.

[ * ] Notice: The portion of the term of this patent subsequent to Apr. 22, 2009 has been disclaimed.

[21] Appl. No.: 942,250

[22] Filed: Sep. 9, 1992

Related U.S. Application Data

[63] Continuation-in-part of Ser. No. 650,057, Feb. 4, 1991, Pat. No. 5,149,132.

[51] Int. Cl.⁵ .............................................. B62D 21/11
[52] U.S. Cl. ................... 280/785; 280/788; 280/800; 280/799
[58] Field of Search ............... 280/781, 785, 788, 797, 280/798, 799, 800; 296/29, 204

[56] References Cited

U.S. PATENT DOCUMENTS

| Re. 20,197 | 12/1936 | Crowe | 280/797 |
|---|---|---|---|
| 1,638,948 | 8/1927 | Masury et al. | 280/798 |
| 1,698,179 | 1/1929 | Walker | 280/800 |
| 2,173,525 | 9/1939 | Wallace | 280/797 |
| 2,344,378 | 3/1944 | Wagner | 280/797 |
| 2,603,506 | 7/1952 | Johnson | 280/800 |
| 2,794,650 | 6/1957 | Schilberg | 280/790 |
| 3,177,005 | 4/1965 | Duero et al. | 280/788 |
| 3,177,032 | 4/1965 | Jaskowiak | 296/35.1 |
| 3,606,437 | 9/1971 | Pierce | 296/35.1 |
| 3,614,124 | 10/1971 | Schwabenlender | 280/788 |
| 4,386,792 | 6/1983 | Moore et al. | 280/781 |
| 4,881,756 | 11/1989 | Kumasaka et al. | 280/785 |

FOREIGN PATENT DOCUMENTS

| 0736950 | 7/1943 | Fed. Rep. of Germany | 280/788 |
|---|---|---|---|
| 1780204 | 12/1971 | Fed. Rep. of Germany | |

*Primary Examiner*—Margaret A. Focarino
*Assistant Examiner*—Peter English
*Attorney, Agent, or Firm*—James Earl Lowe, Jr.; Michael E. Taken

[57] ABSTRACT

A vehicle frame (200) has a rear portion with a rear siderail (204) of hat-shape cross-section, and a front portion with a front siderail (202) of C-shape cross-section received within the hat-shaped rear side-rail. The siderails are attached to each other at a joint (206) and have respective vertical sections (208) and (210) in overlapped contact with each other at the joint and providing a first mounting pad (230) of increased stock thickness. A cross member (226) is attached to the siderails at the joint and has a vertical flange (228) in overlapped contact with a respective vertical section (214) of the rear siderail to provide a second mounting pad (232) of increased stock thickness. A spring hanger (218) is mounted to and extends horizontally between the mounting pads.

11 Claims, 5 Drawing Sheets

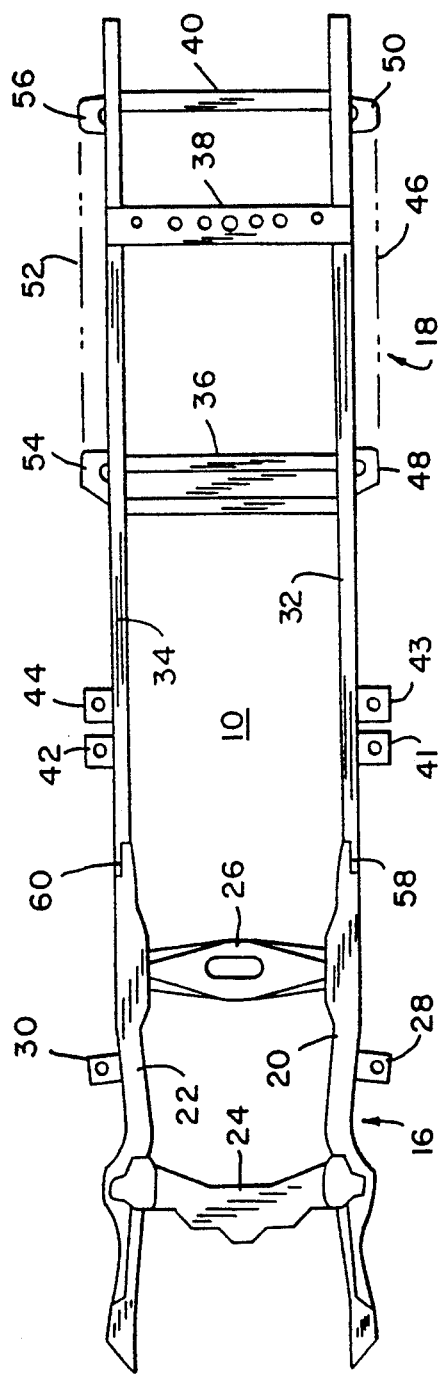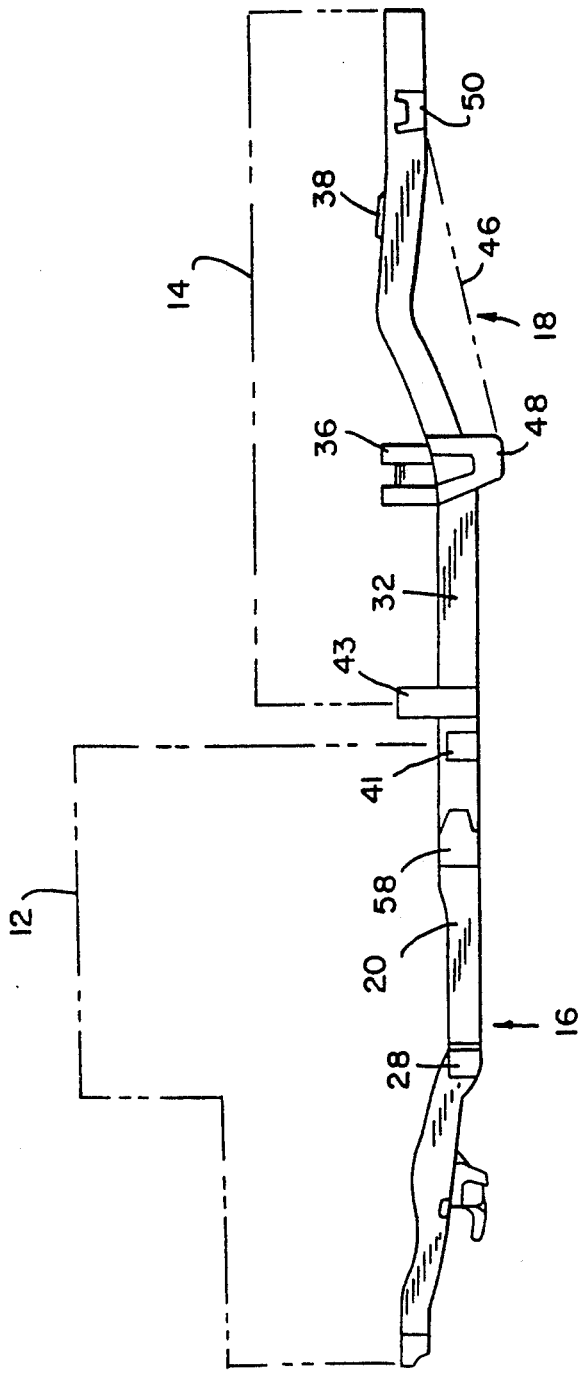

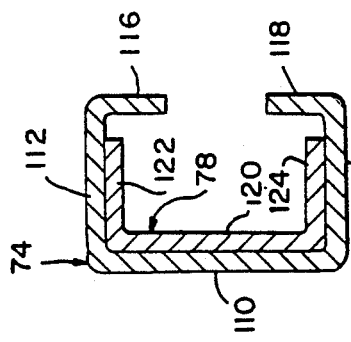
FIG. 5
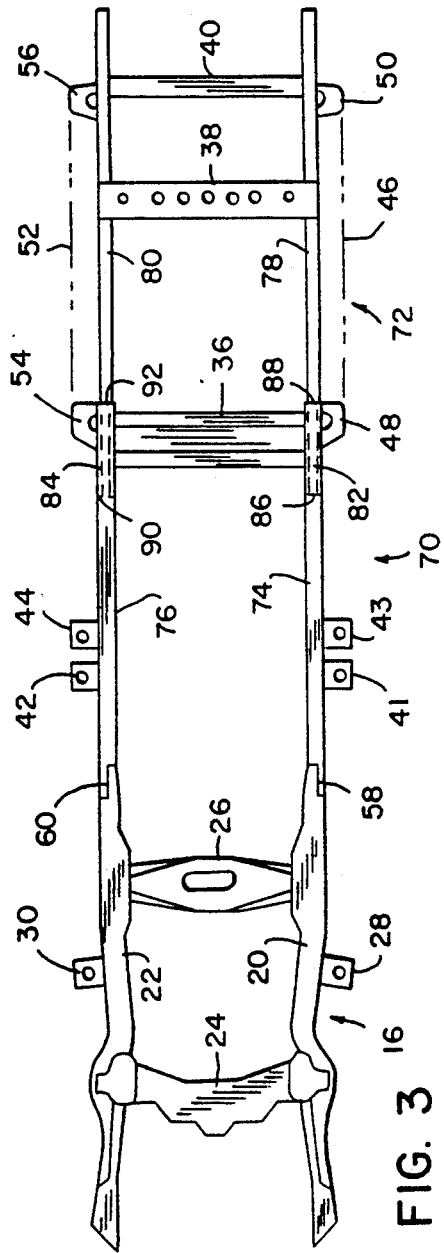
FIG. 3
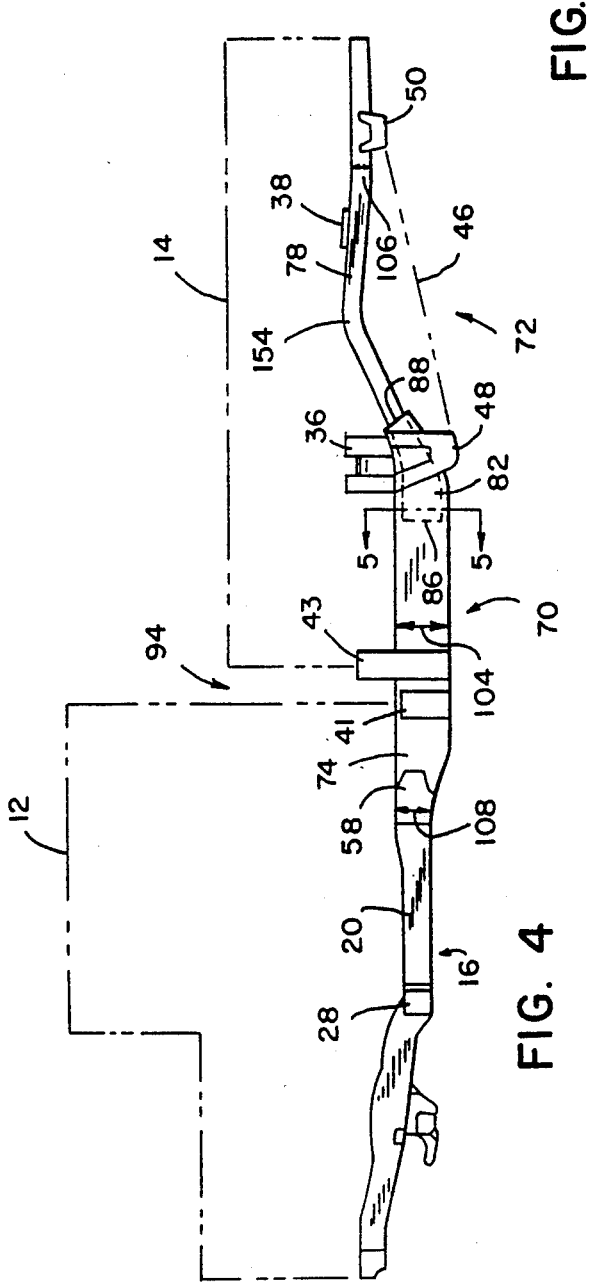
FIG. 6
FIG. 4

VEHICLE FRAME WITH OVERLAPPED SECTIONS

CROSS REFERENCE TO RELATED APPLICATION

This application is a continuation-in-part of application Ser. No. 07/650,057, filed Feb. 4, 1991, U.S. Pat. No. 5,149,132.

BACKGROUND

The parent invention relates to truck frames for supporting the non-continuous, structural components of a truck, the components including a front cab and a rear load box.

Truck frames known in the prior art include a front frame for supporting the front cab, and a rear frame for supporting the front cab and the rear load box. The siderails of the front and rear frames are connected at joints beneath the front cab. Each rear frame siderail is a continuous one-piece member. Various attempts have been made in the prior art to reduce the weight and cost of the rear frame, and typically involve reducing the gauge of the frame material and adding reinforcement for strength where needed. Added parts involve detail and assembly costs such that in this approach the weight and cost goals can work against each other.

The present invention arose during continuing development efforts and provides improvements not only in truck frames but also frames for other vehicles such as automobiles.

SUMMARY

The invention of the noted parent application achieves cost and weight reductions, but along a different approach than the prior art. In the parent invention, each siderail of the truck rear frame is split into structural components formed separately but attached at a designated location and orientation. In one embodiment, prior eleven to eleven and one-half foot rear siderails are each replaced by two six foot siderails overlapped by one-half to one foot.

In one aspect, the parent invention provides significant weight reduction, approaching 25%.

In another aspect, the parent invention has pleasantly been found to further provide significant cost reductions, both in material cost and in manufacturing cost. In one desirable application, the parent invention enables coil-fed sheet steel to be cut off cross-coil with a knife edge or other cutting tool. This provides steel utilization approaching 100%. Sheet steel is available in six foot coil rolls, but not eleven foot coil rolls. Hence, in the prior art, to form an eleven foot long rear siderail, the sheet steel is longitudinally cut from the coil and then blanked, which limits steel utilization to 90%. If a vertically offset siderail portion is needed for the rear wheels, a separate "kick-up" or "edge-bend" operation is performed to provide such offset using a pre-cut rectangular strip prior to blanking. Alternatively, in the prior art, the vertical offset is provided by using a die with the required shape to form such vertical offset during the blanking operation, which eliminates the necessity for a kick-up operation Perhaps five blanks could be cut from one longitudinal sheet. However, the latter alternative suffers from only a 70% steel utilization factor. The parent invention enables steel utilization approaching 100% because a six foot siderail is cut cross-coil from a six foot roll by a cutting tool, or by blanking, and increases steel utilization from the prior 70%–90% factor to a near 100% factor by avoiding the contour scrap at the top and bottom of a longitudinally cut sheet. Up to 2,000 blanks might come from one coil set-up. If a vertically offset siderail portion is needed for the rear wheels, the present invention enables use of a coil-fed cut-off tool having a given shape to provide the vertical offset during the cutting operation from the roll. This maintains a near 100% utilization factor, notwithstanding the noted vertical offset, which was not possible in the prior art. The parent invention thus provides significant reduction in material cost. The parent invention also provides reduction in manufacturing cost by eliminating the noted separate kick-up operation for forming a vertical offset siderail portion. The achievement of both reduced material cost and reduced manufacturing cost, in combination with the noted substantial weight reduction, and manufacturing flexibility, is considered a significant advance in the art, and provides results which were previously incompatible in the art.

In another aspect the elimination of the kick-up or edge-bend operation allows the use of higher strength siderail steel without the prior risk of splitting during forming.

In another aspect, the parent invention enables smaller less expensive tooling, shorter tooling lead time, and smaller presses for forming the sheet material after it is cut off the roll. The use of smaller presses is particularly advantageous because it in turn enables faster cycle times, i.e. the smaller press ram moves faster than a larger press ram. Faster cycle time is desirable because it enables a single set of tooling to provide a high feed-through rate, and eliminates the need for further sets of duplicate tooling which would otherwise be required for higher through-put. The parent invention thus affords significant manufacturing efficiencies by enabling more frames to be processed in less time and with less tooling cost.

In another aspect, the parent invention provides double stock thickness where needed at highly stressed rear spring front hangers, and enables minimum required gauge material to be provided fore and aft thereof.

In another aspect, the parent invention eliminates the need for forming operations around rear spring front hanger rivets otherwise needed for strengthening same.

In another aspect, the parent invention reduces required manpower and/or handling equipment. For example, one man can handle a twenty-five pound six foot siderail. However, an eleven foot siderail of twice or more the weight requires two men and/or mechanized handling equipment.

In another aspect, the parent invention enables smaller simpler siderail sections, which increases outsourcing possibilities for tooling and/or manufacturing. For example, large presses and kick-up presses are sparse, and typically require high transportation costs to ship the formed parts to satellite assembly plants. The parent invention eliminates such transportation costs by enabling local sourcing and forming of the parts.

In another aspect, the parent invention enables wide, lipped flanges and deep, thinner web sections for high bending moment areas between the front cab and rear load box, without the penalty of extra material or section stock otherwise carried by the rear, lightly loaded, siderail segment or trimmed off as scrap.

In another aspect, the parent invention allows an embodiment providing conversion of the rear siderail section to a cross-sectional hat shape while retaining a lipped channel siderail section forward thereof. This eliminates unique left and right hand rear siderail tooling, and the fabrication of and inventory of left and right hand detail parts, including front and rear hangers for the rear spring, which saves substantial tool and unit cost and weight.

In another aspect, the parent invention allows the selection of an alternate material, such as aluminum or a lighter gage or lower strength steel, for the more lightly loaded rear section of the siderail.

The present invention provides further improvements and cost reductions in truck frames as above, and also in frames for other vehicles such as automobiles.

In one aspect, the present invention enables elimination of a spring hanger bracket, thus providing a cost reduction.

In another aspect, enhanced reinforcement and strength is provided with simplified structure joining siderails at an overlapped contact joint.

In another aspect, one of the siderails has a hat-shape cross-section, and the siderails have respective vertical sections in overlapped contact with each other at the joint.

In a further aspect, the hat-shape cross-section has first and second parallel spaced vertical segments, and a third upper horizontal segment spanning the first and second segments, and a spring hanger is mounted to and extends between the first and second segments at the overlapped contact of the respective vertical sections of the siderails.

In another aspect, siderails are attached at a joint and have respective vertical sections in overlapped contact with each other at the joint, and a spring hanger is mounted to the siderails at the joint at the overlapped contact of the respective vertical sections.

In a further aspect, a spring hanger extends horizontally between first and second spaced vertical mounting pads, the first mounting pad being formed by the respective vertical sections of the siderails in overlapped contact. In a further aspect, the second mounting pad is formed by a vertical section of one of the siderails.

In another aspect, a cross member is attached to siderails at their joint and has a laterally extending vertical flange in overlapped contact with a respective vertical section of one of the siderails. In a further aspect, the overlapped contact of the respective vertical sections of the siderails provides a first mounting pad of increased stock thickness, and the overlapped contact of the vertical flange of the cross member and the respective vertical section of one of the siderails provides a second mounting pad of increased stock thickness, the first and second mounting pads being horizontally spaced from each other, and a spring hanger is mounted to and extends between the mounting pads. In a further aspect, the cross member has a second laterally extending vertical flange spanning segments of one of the siderails.

In another aspect, a siderail of hat-shape cross-section is attached to a siderail of C-shape cross-section in overlapped contact, with the siderail of C-shape cross-section being received within the siderail of hat-shape cross-section.

BRIEF DESCRIPTION OF THE DRAWINGS

FIG. 1 is a top view of a truck frame known in the prior art.

FIG. 2 is a side view of the truck frame of FIG. 1.

FIG. 3 is a top view of a truck frame constructed in accordance with the invention of above noted parent application Ser. No. 07/650,057, filed Feb. 4, 1991.

FIG. 4 is a side view of the truck frame of FIG. 3.

FIG. 5 is an enlarged sectional view taken along line 5—5 of FIG. 4.

FIG. 6 is a view like FIG. 5 and shows an alternate embodiment.

DETAILED DESCRIPTION

Figure 7:
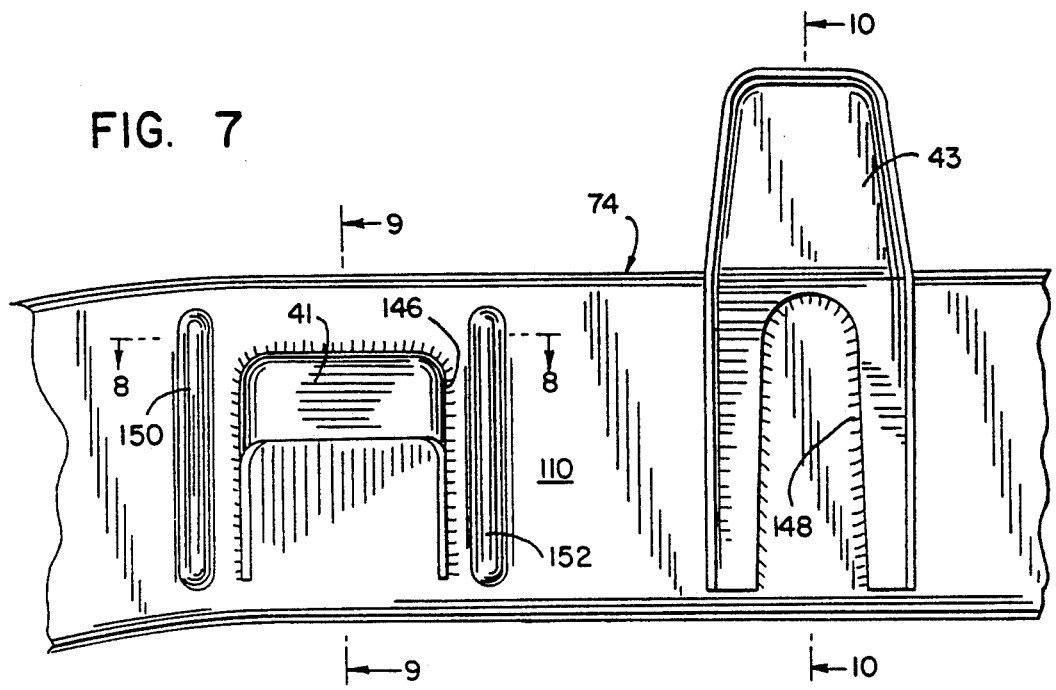
FIG. 7 is an enlarged view of a portion of FIG. 4.
Figure 8:
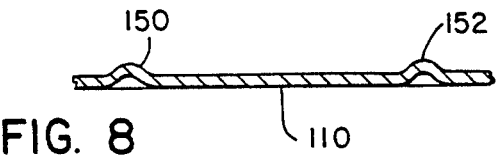
FIG. 8 is a sectional view taken along 8—8 of FIG. 7.
Figure 9:
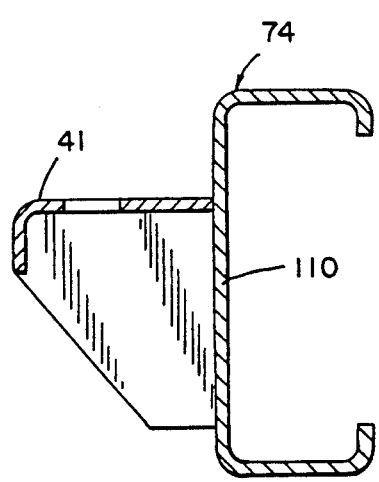
FIG. 9 is a sectional view taken along line 9—9 of FIG. 7.
Figure 10:
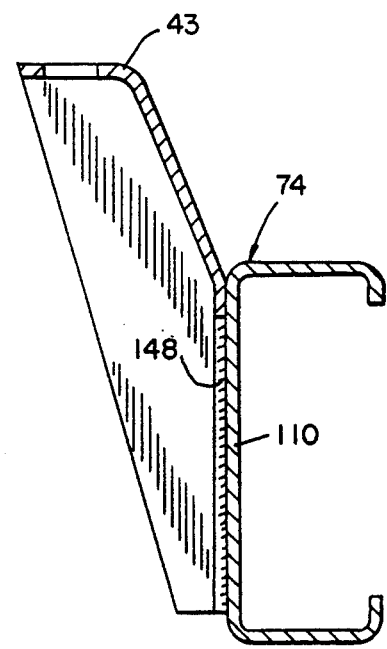
FIG. 10 is a sectional view taken along line 10—10 of FIG. 7.

FIGS. 1 and 2 show a truck frame 10 for supporting the non-continuous, structural components of a truck, the components including a front cab 12 and a rear load box 14. Frame 10 includes a front frame 16 supporting front cab 12, and a rear frame 18 supporting front cab 12 and rear load box 14. Front frame 16 includes left and right siderails 20 and 22, and cross members 24, 26 extending laterally therebetween and welded and/or riveted and/or bolted thereto. Cab supports 28 and 30 are attached to respective siderails 20 and 22 by welding, rivets, or the like. Rear frame 18 includes left and right siderails 32 and 34, and cross members 36, 38, 40 extending laterally therebetween and welded and/or riveted thereto. Supports 41 and 42 are attached to respective siderails 32 and 34 by welding, rivets, or the like, and support the rear of cab 12. Supports 43 and 44 are attached to respective siderails 32 and 34 by welding, rivets, or the like, and support the front of load box 14. A left rear spring 46 is supported between left rear spring front hanger 48 and left rear spring rear hanger 50 attached, preferably by rivets, to left siderail 32 of rear frame 18. Right rear spring 52 is supported between right rear spring front hanger 54 and right rear spring rear hanger 56 attached, preferably by rivets, to right siderail 34 of rear frame 18. Left siderails 20 and 32 are attached by welding, rivets, or the like, at joint 58 beneath front cab 12. Right siderails 22 and 34 are attached by welding, rivets, or the like, at right joint 60 beneath front cab 12. In one embodiment, the length of each of rear siderails 32 and 34 is about eleven to eleven and one-half feet.

FIGS. 3 and 4 illustrate the invention of the noted parent application and use like reference numerals from FIGS. 1 and 2 where appropriate to facilitate understanding. In the parent invention, the truck rear frame 18 of FIGS. 1 and 2 is split into a front portion 70 supporting front cab 12 and rear load box 14, and a rear portion 72 supporting rear load box 14. Front portion 70 has left and right siderails 74 and 76 attached by welding, rivets, or the like, to siderails 20 and 22 of front frame 16 at joints 58 and 60, as in FIG. 1. Rear portion 72 has left and right siderails 78 and 80 having cross members 36, 38, 40 extending laterally therebetween and welded and/or riveted thereto. Siderails 78 and 80 are attached to siderails 74 and 76 at respective left and right overlap joints 82 and 84, preferably by the same rivets which attach spring hangers 48 and 54, or alternatively or additionally by welding, controlled deformation to achieve a mechanical lock, adhesive bonding, or the like.

Left joint 82 has a front end 86 at the front of siderail 78 of rear portion 72, and a rear end 88 at the rear of siderail 74 of front portion 70. Right joint 84 has a front end 90 at the front of siderail 80 of rear portion 72, and a rear end 92 at the rear of siderail 76 of front portion 70. Front ends 86 and 90 of respective joints 82 and 84 are immediately forward of respective rear spring front hangers 48 and 54. The rear ends 88 and 92 of joints 82 and 84 are immediately rearward of respective rear spring front hangers 48 and 54. Cross member 36 extends between joints 82 and 84. Front cab 12 and rear load box 14 face each other at a gap 94 of discontinuity, which gap is above front portion 70 of the rear frame. Front ends 86 and 90 of joints 82 and 84 are rearward of gap 94. Cab support 41 and load box support 43 are attached to siderail 74, preferably by welding. Cab support 42 and load box support 44 are attached to siderail 76, preferably by welding.

Each siderail 74, 76 of front portion 70 has an increased vertical section height as shown at 104, below gap 94, to provide increased support and resistance to bending at gap 94. Each siderail 78 and 80 of rear portion 72 has a reduced vertical section height, as shown at 106, at the respective rear spring rear hanger 50, 56 to reduce weight thereat. Each of the front ends of siderails 74, 76 of front portion 70 at joints 58, 60 has a given vertical section height, as shown at 108, which matches the vertical section height of siderails 20, 22 of front frame 16. Vertical section height 104 is greater than vertical section height 108. Vertical section height 106 is less than vertical section height 108. Siderail 74 has a tapered vertical section height, providing a reduced vertical section height 108 at its forward end, an increased vertical section height 104, and a reduced vertical section height at its rear end at 88. Siderail 78 has a tapered vertical section height, providing an increased vertical section height at its forward end at 86, and a reduced vertical section height 106 at its rear end. The front end 86 of joint 82 has a greater vertical section height than the rear end 88 of the joint. The rear section of siderail 74 has a tapered vertical section height which decreases from the front end 86 of joint 82 to the rear end 88 of the joint at the rear of siderail 74. Siderail 78 has a front section with a tapered vertical section height which increases from the rear end 88 of joint 82 to the front end 86 of the joint at the front of siderail 78. Right siderails 76 and 80 are comparable.

The parent invention enables the siderails of the front and rear portions 70 and 72 to have different cross-sectional shapes for differing strength, load, and bending resistance requirements, and enabling cost-effective structure satisfying same without the above noted penalties such as excess material or stock being carried in remaining sections where unneeded. In FIG. 5, siderail 74 is a C-shaped member with web section 110 extending vertically between top and bottom end segments 112 and 114 having inner inwardly turned lipped flanges 116 and 118. Siderail 78 is nested within siderail 74 at overlap joint 82 and is a C-shaped member having a web section 120 extending vertically between top and bottom end segments 122 and 124, which end segments do not have inner inwardly turned lipped flanges such as 116, 118. Siderail 78 is nested within siderail 74 in the overlapped area by bending the lip end flanges 116 and 118 out so the siderail 78 can be placed within the siderail 74. The flanges are then returned to the positions shown in FIG. 5.

In another embodiment as shown in FIG. 6, siderail 78a of rear portion 72 has a hat-shape cross-section of reduced stock thickness, with sections 126 and 128 extending vertically between a top end segment 130 and lower horizontal flange segments 132 and 134. Siderail 74a of front portion 70 is nested within siderail 78a and has a web section 136 extending vertically between top and bottom end segments 138 and 140 having inwardly turned lipped flanges 142 and 144.

The increased vertical height and/or thinning of web section 110, FIG. 5, or web section 136, FIG. 6, at 104, FIG. 4, may subject the web section of the siderail to oil-canning. Cab support 41 and load box support 43 are welded to siderail 74 at respective weld beads 146 and 148, FIG. 7. Supports 41 and 43, and their respective weld beads, stiffen the web section against oil-canning. Formed vertical ribs 150 and 152 on siderail 74 are provided to protect weld bead 146 of the lower height support 41 against oil-canning of web section 110. The ribs in combination with weld beads 146 and 148 further stabilize the siderail web section. Oil-canning would be the repeated significant elastic deflection of the web section 110.

Overlap joints 82 and 84 provide double stock thickness at rear spring front hangers 48 and 54. This is particularly desirable because the rear spring front hangers are highly stressed areas. Rivets are usually used for attaching the rear spring front hangers to the siderails of the frame. The overlap joints 82, 84 enable the noted double stock for enhanced strength rivet attachment, and also allows minimum required gauge material fore and aft of the joint. The joint also enables elimination of prior forming of strengthening ribs around the rear spring front hanger rivets and reduces the expense of pierce-after-form requirements between such ribs.

The parent invention enables wide lipped flanges such as 116, 118 and deep thinner web sections such as 110 for the high bending moment area at gap 94 between front cab 12 and rear load box 14, without carrying the extra blank stock on siderail 78 which does not need same. The parent invention enables siderail 78 to be a different gauge and/or lighter weight material than siderail 74. In one embodiment, aluminum or a lighter gauge or lower strength steel may be used for siderails 78, 80 of rear portion 72. Alternately, or in combination, siderail 78 is thinner than siderail 74, in addition to having a lesser height web section 120 than web section 110 of siderail 74. Furthermore, the web section heights may be varied from a maximum as shown at 104 to a minimum as shown at 106, to localize and maximize the vertical section height where needed, and to localize and minimize the vertical section height where unneeded, reducing the penalty of extra material or section stock otherwise carried.

In a particularly desirable implementation, the continuous one-piece siderail 32 of FIG. 1 is replaced by two six foot siderails 74, 78 of FIG. 3, which enables near 100% steel utilization. Sheet steel is available in six foot coiled rolls, and may be cut off with a knife edge or other cutting tool, after which the cut-off sheet is formed to the C-shaped siderail section shown in FIG. 5. Use of a coil-fed cut-off tool or coil-fed blanking eliminates the steel waste in prior sheet or strip blanking of rear frame siderails. The parent invention also eliminates a separate kick-up operation for vertical offsets, without decreasing the steel utilization factor. To provide the vertical offset at 154, FIG. 4, of the truck frame at the rear wheel, the parent invention enables the use of a coil-fed cut-off tool having a given shape to provide the noted vertical offset 154 during the cutting operation from the roll. Besides the manufacturing cost savings, elimination of the subsequent, separate kick-up forming step is desirable for improving strength by minimizing the strain and deformation in the material otherwise caused by such kick-up operation. This allows siderails to be formed from higher strength steel which would otherwise be subject to splitting.

In the preferred embodiment, the truck rear frame provided by portions 70 and 72 has a left side provided by left siderail 74, left joint 82, and left siderail 78, all lying in substantially the same fore-aft left vertical plane. Rear end 88 of joint 82 is substantially directly behind front end 86 of joint 82 without substantial diagonal or lateral offset. The truck rear frame has a right side provided by right siderail 76, right joint 84, and right siderail 80 all lying in substantially the same fore-aft right vertical plane without substantial diagonal or lateral offset. Rear end 92 of joint 84 is spaced substantially directly behind front end 90 of joint 84 without substantial diagonal or lateral offset. The noted left and right sides extend substantially parallel to each other such that any convergence or divergence is less than about 10°. The portions of siderails 74 and 78 at joint 82 and the portions of siderails 76 and 80 at joint 84 are all substantially coplanar.

FIGS. 11-17 illustrate the present invention. FIGS. 11-17 show improved frame structure, particularly for joint 82 of front and rear portions 70 and 72 of truck rear frame 18, though the invention is not limited thereto and may be applied to frames of other vehicles.

Figure 11:
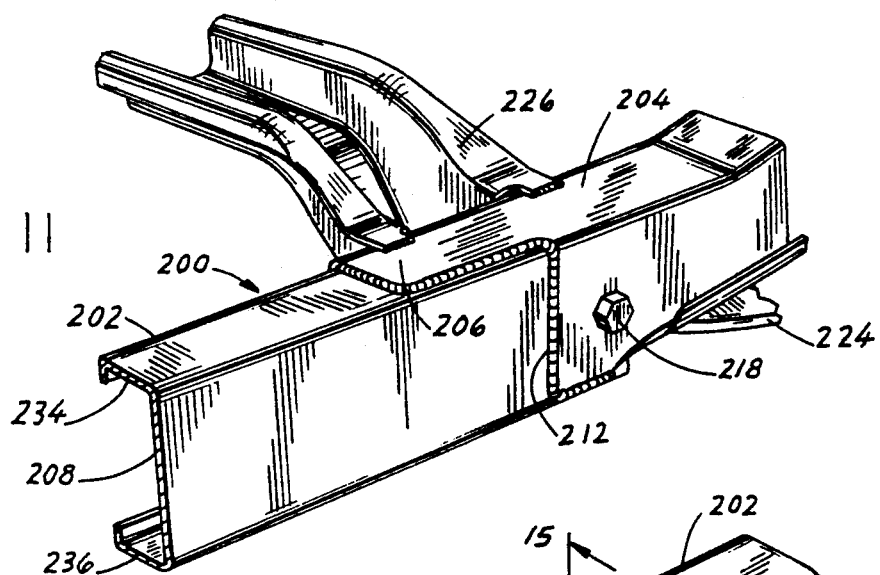
FIG. 11 is a perspective view of a portion of a vehicle frame constructed in accordance with the present invention.

Frame 200, FIG. 11, has a front portion with a front siderail 202, and a rear portion with a rear siderail 204. As in the above parent application, each of the siderails is a structural component formed separately from the other siderail but attached thereto at a joint 206. Rear siderail 204 has a hat-shape cross-section, FIGS. 12 and 16, and front siderail 202 has a C-shape cross-section, also as in FIG. 6. Siderails 202 and 204 have respective vertical sections 208 and 210, FIGS. 13 and 16, in overlapped contact with each other at joint 206. C-shaped front siderail 202 is received within hat-shaped siderail 204. The siderails are preferably welded to each other at joint 206, as shown at weld bead 212, though they may be attached by other means such as bolts, rivets, staking, etc.

Figure 16:
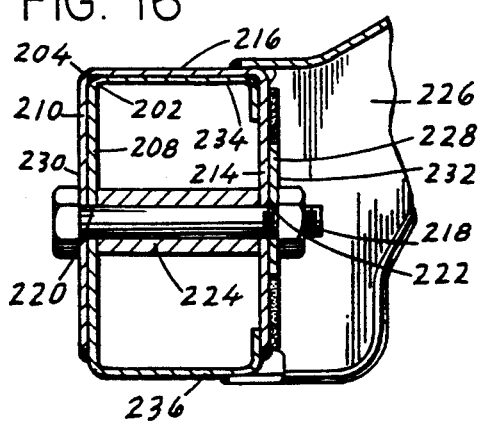
FIG. 16 is a cross sectional view taken along line 16—16 of FIG. 15.
Figure 17:
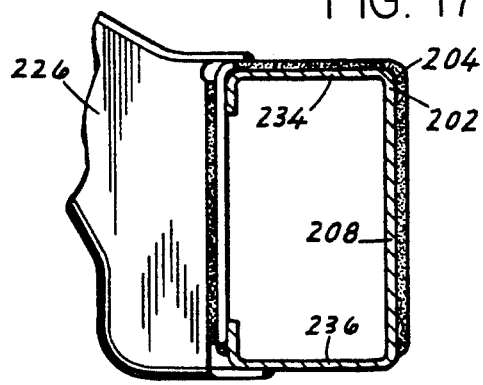
FIG. 17 is a cross sectional view taken along line 17—17 of FIG. 15.

Hat-shaped rear siderail 204 has spaced parallel vertical segments 210 and 214, FIG. 16, and an upper horizontal segment 216 spanning segments 210 and 214. A spring hanger 218 is mounted to and extends between segments 210 and 214 at the overlapped contact of the noted respective vertical sections of the siderails at joint 206. The spring hanger is provided by a bolt extending through apertures 220 and 222 in the respective segments and supports a spring such as leaf spring 224.

Figure 12:
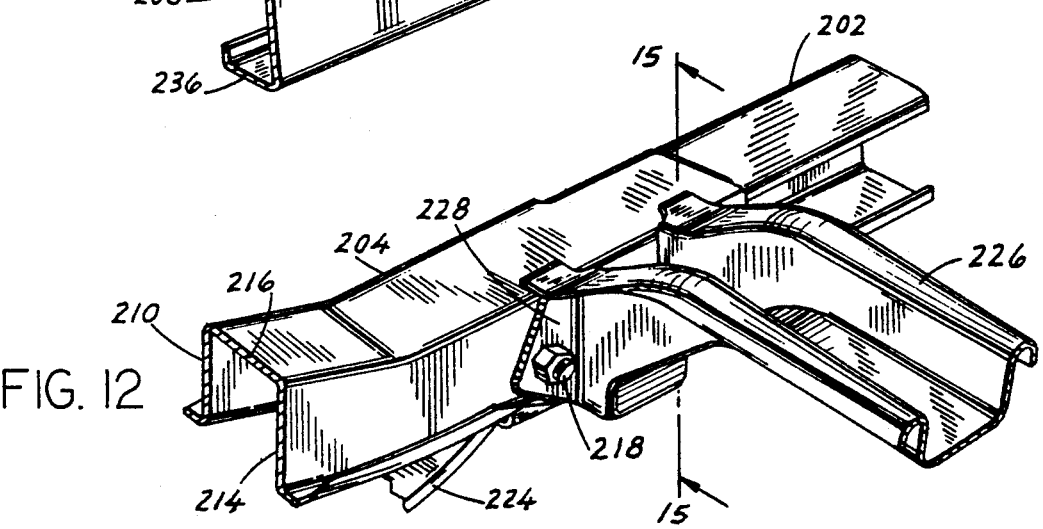
FIG. 12 is another perspective view of the frame of FIG. 11.
Figure 13:
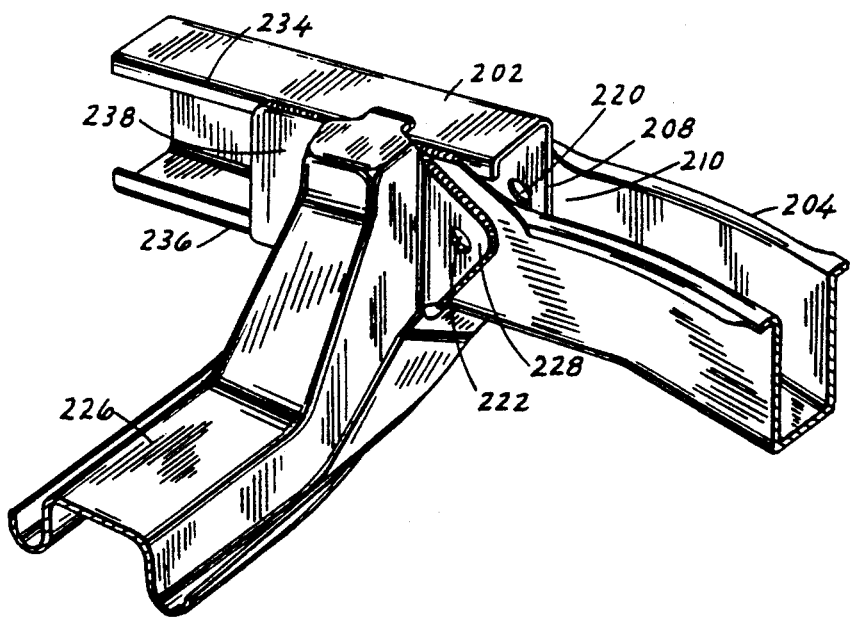
FIG. 13 is another perspective view of the frame of FIG. 11.
Figure 14:
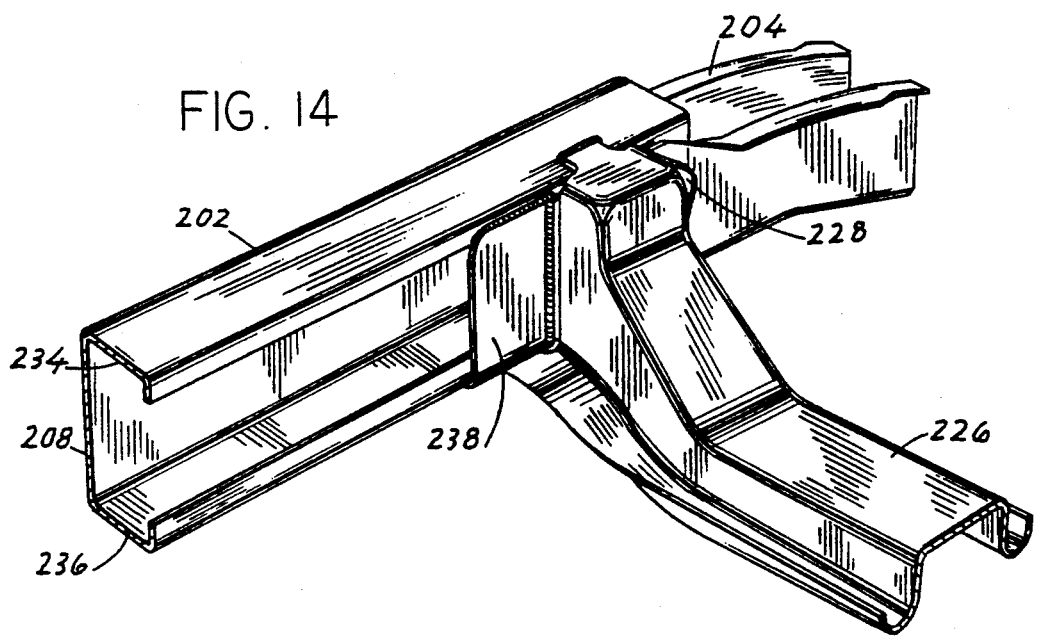
FIG. 14 is another perspective view of the frame of FIG. 11.
Figure 15:
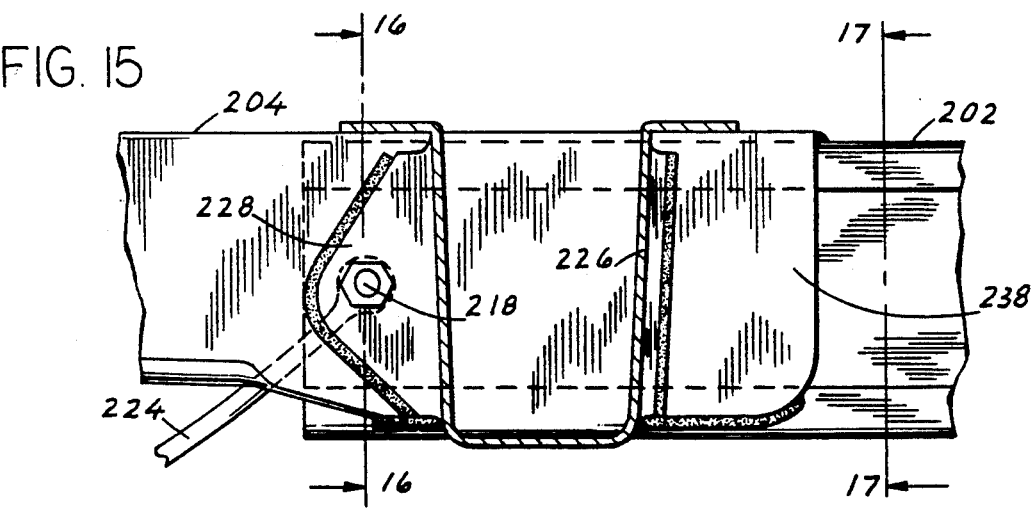
FIG. 15 is a partial cross sectional view taken along line 15—15 of FIG. 12.

A cross member 226, FIGS. 11 and 12, is attached to front and rear siderails 202 and 204 at joint 206, as above in FIGS. 3 and 4. Cross member 226 has a vertical flange 228, FIG. 12, in overlapped contact with vertical section 214, FIG. 16, of rear siderail 204. The overlapped contact of respective vertical sections 208 and 210 of front and rear siderails 202 and 204 provides a first mounting pad 230 of increased stock thickness. The overlapped contact of vertical flange 228 of cross member 226 and respective vertical section 214 of rear siderail 204 provides a second mounting pad 232 of increased stock thickness. Mounting pads 230 and 232 are horizontally spaced from each other. Spring hanger 218 is mounted to and extends horizontally between mounting pads 230 and 232 through aperture 220 in sections 208 and 210 and through aperture 222 in section 214 and flange 228.

C-shaped front siderail 202 has spaced parallel horizontal segments 234 and 236, FIG. 16, and a vertical segment 208 spanning segments 234 and 236. Cross member 226 has a second vertical flange 238, FIGS. 13 and 14, spanning segments 234 and 236 of siderail 202 and horizontally spaced from segment 208 of siderail 202. The cross member, including its flanges, is preferably attached to the siderails by welding, as shown at the welding beads.

It is recognized that various equivalents, alternatives and modifications are possible within the scope of the appended claims.

We claim:

1. A vehicle frame comprising a first portion having a first siderail, a second portion having a second siderail, each of said siderails being a structural component formed separately from the other siderail but attached thereto at a joint, one of said siderails having a hat-shape cross-section, said first and second siderails having respective vertical sections in overlapped contact with each other at said joint, said hat-shape cross-section comprising first and second spaced parallel vertical segments, with one of said first and second segments forming said respective vertical section of one of said siderails, and a third upper horizontal segment spanning said first and second segments, and comprising a spring hanger mounted to and extending between said first and second segments at said overlapped contact of said respective vertical sections of said first and second siderails.

2. A vehicle frame for supporting the structural components of a vehicle, said frame having a rear spring front hanger and a rear spring rear hanger for supporting a rear spring therebetween, said frame comprising a first portion having a first siderail, a second portion having a second siderail, each of said siderails being a structural component formed separately from the other siderail but attached thereto at a joint, said first and second siderails being open channels having respective vertical sections in overlapped contact with each other at said joint, said rear spring front hanger mounted to said siderails at said joint at said overlapped contact of said respective vertical sections.

3. A vehicle frame comprising a first portion having a first siderail, a second portion having a second siderail, each of said siderails being a structural component formed separately from the other siderail but attached thereto at a joint, said first and second siderails having respective vertical sections in overlapped contact with each other at said joint, a spring hanger mounted to said siderails at said joint at said overlapped contact of said respective vertical sections, and said spring hanger extends horizontally between first and second vertical mounting pads, said first mounting pad being formed by said respective vertical sections of said first and second siderails in overlapped contact.

4. The vehicle frame according to claim 3 wherein said second mounting pad is formed by a second vertical section of one of said first and second siderails.

5. A vehicle frame comprising a first portion having a first siderail, a second portion having a second siderail, each of said siderails being a structural component formed separately from the other siderail but attached thereto at a joint, said first and second siderails having respective vertical sections in overlapped contact with each other at said joint, a cross member attached to said first and second siderails at said joint and having a vertical flange in overlapped contact with a second vertical section of said second siderail.

6. A vehicle frame comprising a first portion having a first siderail, a second portion having a second siderail, each of said siderails being a structural component formed separately from the other siderail but attached thereto at a joint, said first and second siderails having respective vertical sections in overlapped contact with each other at said joint, a cross member attached to said first and second siderails at said joint and having a vertical flange in overlapped contact with a second vertical section of said second siderail, and said overlapped contact of said respective vertical sections of said first and second siderails provides a first mounting pad of increased stock thickness, and said overlapped contact of said vertical flange of said cross member and said second vertical section of said second siderail provides a second mounting pad of increased stock thickness, said first and second mounting pads being horizontally spaced from each other, and comprising a spring hanger mounted to and extending between said first and second mounting pads.

7. The vehicle from according to claim 6 wherein said second siderail has a hat-shape cross-section comprising first and second spaced parallel vertical segments, and a third upper horizontal segment spanning said first and second segments, said first segment forming said respective vertical section of said second siderail and being in said overlapped contact with said respective vertical section of said first siderail to provide said first mounting pad of increased stock thickness, said second segment forming said second vertical section of said second siderail and being in said overlapped contact with said vertical flange of said cross member to provide said second mounting pad of increased stock thickness.

8. The vehicle frame according to claim 7 wherein said first siderail has a C-shape cross-section and is received within said hat-shape cross-section, said C-shape cross-section having first and second spaced parallel horizontal segments, and a third vertical segment forming said respective vertical section of said first siderail and spanning said first and second segments of said C-shape cross-section, and wherein said cross member comprises a second vertical flange spanning said first and second segments of said C-shape cross-section and horizontally spaced from said third segment of said C-shape cross-section.

9. A vehicle frame comprising a first portion having a first siderail, a second portion having a second siderail, each of said siderails being a structural component formed separately from the other siderail but attached thereto at a joint, a cross member attached to said first and second siderails at said joint and having a vertical flange in overlapped contact with a vertical section of at least one of said siderails.

10. A vehicle frame for supporting the structural components of a vehicle, said frame having a rear spring front hanger and a rear spring rear hanger for supporting a rear spring therebetween, said frame comprising a first portion having a first siderail, a second portion having a second siderail, each of said siderails being a structural component formed separately from the other siderail but attached thereto at a joint, said first and second siderails being open channels having respective vertical sections in contact with each other in said joint, said rear spring front hanger mounted to said siderails at said joint at said contact of said respective vertical sections.

11. A vehicle frame for supporting the structural components of a vehicle, said frame including a front portion having left and right siderails; a rear portion having left and right siderails; said frame comprising each siderail of said front portion being a structural component formed separately from the respective siderail of said rear portion but attached thereto at right and left overlapping joints, said frame having a left side provided by said left siderail of said front portion, said left joint, and said left siderail of said rear portion, said rear portion having a single left rear spring front hanger and a single left rear spring rear hanger rigidly attached to said left side of said rear portion left siderail for supporting a left rear spring therebetween, said frame having a right side provided by said right siderail of said front portion, said right joint, and said right siderail of said rear portion, said rear portion having a single right rear spring front hanger and a single right rear spring rear hanger rigidly attached to said right side of said rear portion right siderail for supporting a right rear spring therebetween, said left joint has a front end at the front of said left siderail of said rear portion, said left joint has a rear end at the rear of said left siderail of said front portion, said right joint has a front end at the front of said right siderail of said rear portion, said right joint has a rear end at the rear of said right siderail of said front portion, and said front end of said left joint is in substantially the same fore-aft left vertical plane as said rear end of said left joint, such that said rear end of said left joint is spaced substantially directly behind said front end of said left joint without substantial diagonal or lateral offset, and said front end of said right joint is in substantially the same fore-aft right vertical plane as said rear end of said right joint, such that said rear end of said right joint is spaced substantially directly behind said front end of said right joint without substantial diagonal or lateral offset.

* * * * *